Jan. 24, 1956
M. W. HELLAR, JR., ET AL
UNBALANCE POSITION INDICATOR FOR
DYNAMIC BALANCING APPARATUS
2,731,835
Filed Aug. 19, 1952
2 Sheets-Sheet 2
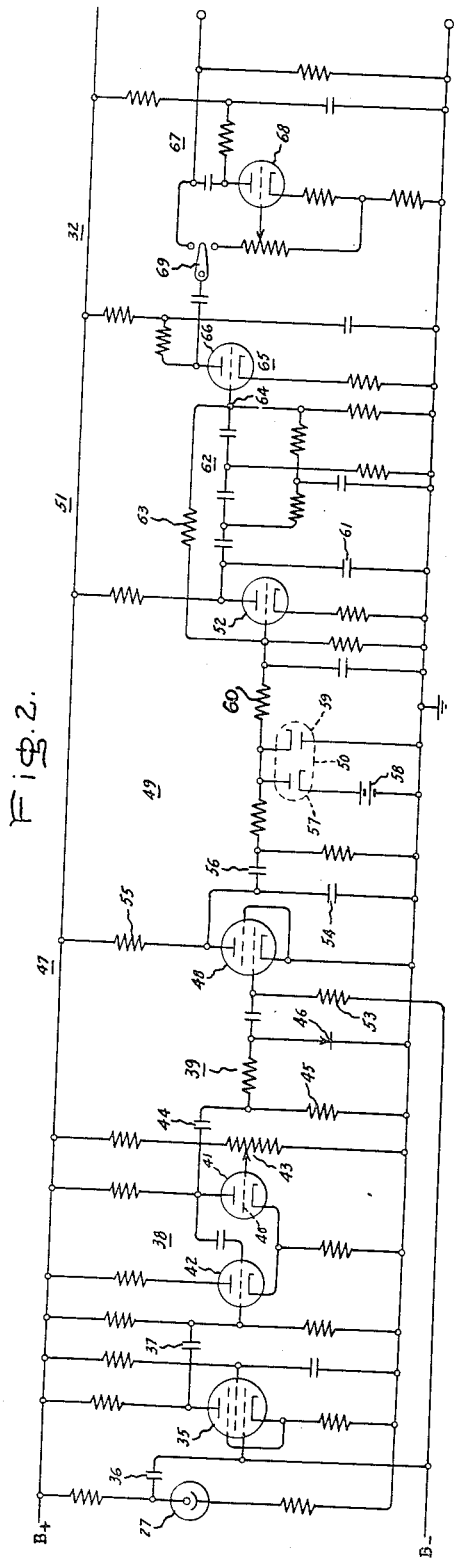
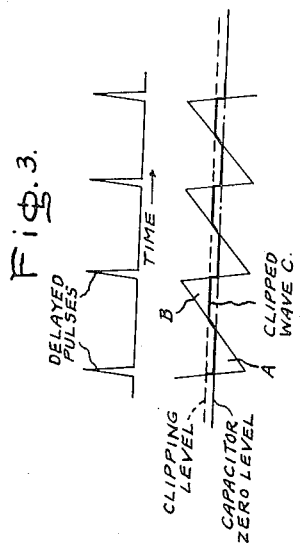
Inventors:
Martin W. Hellar, Jr.,
Billy R. Shepard,
by Paul A. Frank
Their Attorney.

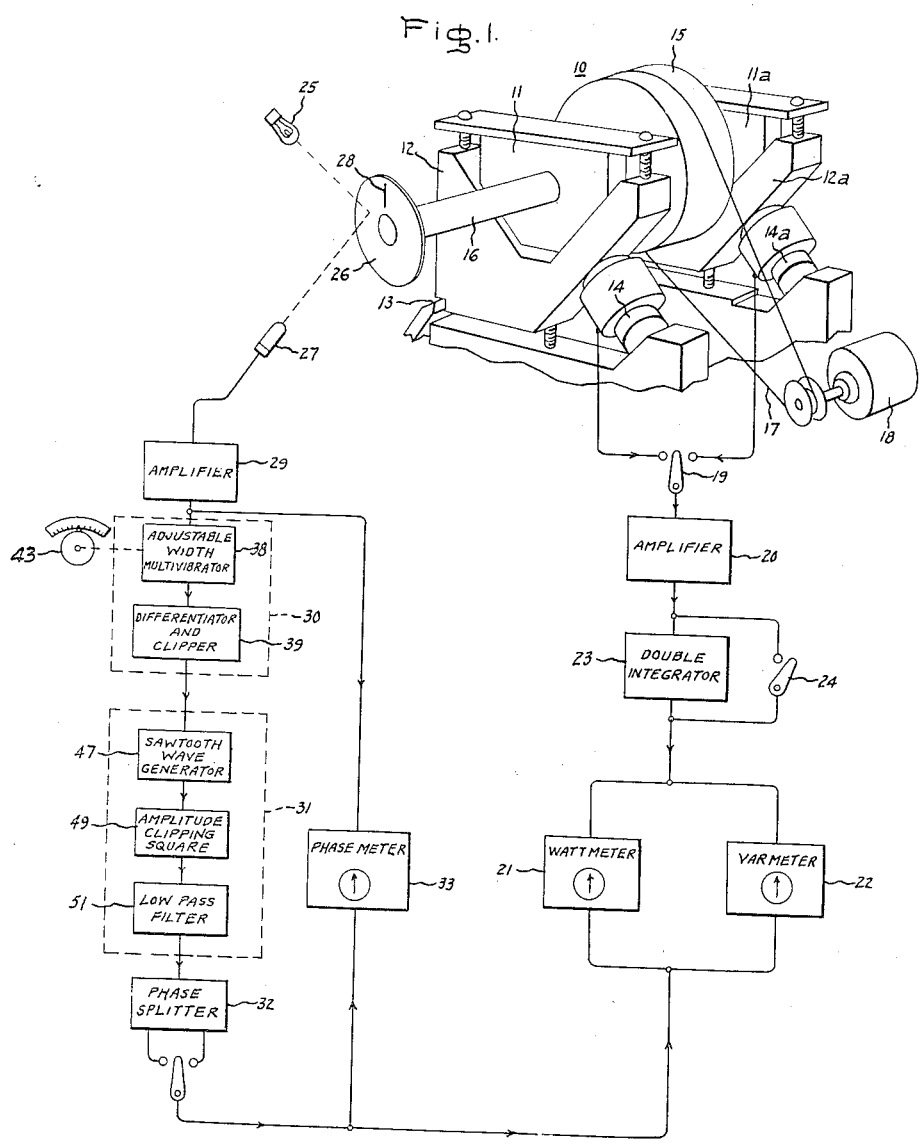

United States Patent Office 2,731,835
Patented Jan. 24, 1956

2,731,835
UNBALANCE POSITION INDICATOR FOR DYNAMIC BALANCING APPARATUS

Martin W. Hellar, Jr., Schenectady, and Billy R. Shepard, Scotia, N. Y., assignors to General Electric Company, a corporation of New York Application August 19, 1952, Serial No. 305,272

5 Claims. (Cl. 73—463)

This invention relates to dynamic balancing apparatus and more particularly to apparatus by which the angular location of unbalance within a rotor to be balanced may be quickly and accurately determined.

In order to balance a rotor properly, both the magnitude and the exact position of the unbalance mass must be determined. In one type of dynamic balancing apparatus, a somewhat flexibly mounted rotor is rotated at speeds well above first critical speed within spaced bearings, and an alternating voltage responsive to the displacement of the rotor from the bearing center line is generated by suitable displacement gages. In another type of dynamic balancing apparatus, the rotor to be balanced is rigidly journalled within rigidly supported bearings, rotated at a speed below the first critical speed of the system, and an alternating voltage representing the unbalance forces acting upon the bearings is generated by suitable force gages. The frequency of such unbalance displacement responsive voltages and such unbalance force responsive voltages is, of course, determined by the rotational speed at which the rotors are driven. The maximum amplitude of such voltages is proportional to the unbalance mass within the rotor to be balanced, and the phase of such voltages relative to an initial rotational position of the rotor may be used to determine the angular location of the unbalance mass within the rotor. Some sort of reference signal representing a particular point or angular position of the rotor must also be produced by the balancing apparatus against which the phase displacement of the unbalance responsive alternating voltage can be compared. This angular position reference signal may be a sine wave whose zero voltage condition indicates a particular rotational position of the rotor or may take the form of an electrical pulse or square wave whose initial voltage rise indicates a particular rotational position of the rotor to be balanced.

In order accurately to determine the phase displacement between the reference signal voltage and the unbalance signal voltage as well as to measure the absolute magnitude of the maximum unbalance signal voltage, either or both the unbalance signal pickup unit and the reference signal pickup unit are usually made mechanically adjustable in rotational position around the axis of the rotor. Such mechanical phase adjusting apparatus is both expensive and difficult to accurately align. Accordingly, one object of the invention is to provide dynamic balancing apparatus in which the phase comparison and the unbalance mass measurement is accomplished by electrical means, and the unbalance signal pickup unit and the angular position reference signal pickup unit may both be fixedly mounted in predetermined positional relation in the rotor support of the dynamic balancing apparatus.

One of the chief difficulties in the provision of electric phase adjusting means rather than mechanical phase adjusting means in dynamic balancing apparatus is that conventional reactance type phase shifting circuits are frequency responsive and thus produce different amounts of phase shift for different rotational speeds of the rotor to be balanced. In addition, if the electric phase shifting circuit acts upon a sinusoidal wave generated directly from the angular position reference signal pickup unit, the amplitude of such sine wave varies with frequency. Moreover, the phase shift circuit also tends to vary the amplitude of the sine wave voltage with frequency. In some types of dynamic balancing apparatus, it is essential that the angle reference signal have a constant amplitude regardless of changes in frequency, such as resulting from changes in the speed of rotation of the rotor to be balanced. Accordingly, another object of the invention is to provide a dynamic balancing apparatus in which phase adjustment between the unbalance signal and the angular position reference signal is accomplished without a reactive type phase shift circuit, and a phase-adjustable output sinusoidal voltage is produced having substantially constant amplitude regardless of frequency variations.

Conventional dynamic balancing apparatus often employs a wattmeter type circuit to perform the actual phase comparison between the angular position reference signal and the unbalance signal as well as to measure the magnitude of the unbalance signal. Such apparatus has generally required two independent phase adjustments before both the angular location and the magnitude of the unbalance can be determined. During the first phase adjustment the angular position of the unbalance is determined by varying the phase of the reference signal relative to the phase of the unbalance signal until the wattmeter reads zero. The phase of the unbalance signal voltage is then displaced an additional 90 degrees relative to the phase of the reference signal voltage in order that the wattmeter circuit may indicate a value proportional to the actual magnitude of the unbalance signal. Another specific object of the invention therefore is to provide dynamic balancing apparatus of the type employing a wattmeter unbalance indicating circuit which requires only a single phase adjustment between the angular position reference signal and the unbalance signal in order to provide an indication of both the amplitude and location of the unbalance mass.

In general, in dynamic balancing apparatus in accord with the invention during each cycle a reference voltage pulse is produced whose time of occurrence represents a predetermined angular position of the rotating body to be balanced. A second voltage pulse is then produced during each cycle that is adjustably delayed in time from the reference voltage pulse and an alternating voltage is generated having a cyclical period equal to the time between successive delayed pulses. The phase of this alternating voltage is compared with the phase of an alternating voltage representing an unbalance signal derived from the rotating body. Such phase comparison means preferably comprises a wattmeter and a varmeter connected in parallel such that the product of two of the alternating input voltages at two ninety-degree-displaced phase angles is simultaneously indicated. As is well known in the art, a wattmeter is an instrument which measures the product of two electric waves, such as voltage and current waves, times the cosine of the phase angle between them, while a varmeter is an instrument which measures the product of two electric waves times the sine of the phase angle between them.

The novel features which are believed characteristic of the invention are set forth in the appended claims. The invention itself, however, together with further objects and advantages thereof may best be understood by reference to the following description taken in connection with the accompanying drawing in which Fig. 1 is a diagrammatic representation of a rotor supporting pedestal and pickup units associated therewith, together with a block diagram of electrical circuitry embodying the invention; Fig. 2 is a schematic circuit diagram of an angular position detecting channel of the apparatus of Fig. 1; and Fig. 3 is a group of wave shapes illustrating the operation of a sawtooth wave generator and clipper included in the apparatus of Fig. 1.

Referring to Fig. 1, there is shown a rotor supporting unit 10 of the rigid pedestal type in which a pair of relatively massive bearing members 11 and 11a are supported on rigid supports 12 and 12a by means of knife edges 13 and 90-degree-displaced force gages 14, 14a. Force gages 14 and 14a preferably each comprise two barium titanate slabs separated by a thin electrode (not shown) and piezoelectrically polarized in opposite directions relative to the central electrode such that a voltage is produced between the central electrode and the supports 12, 12a whenever a mechanical compressive force is applied to the barium titanate slabs. A rotor 15 to be balanced is axially mounted on a rigid shaft 16 journalled in bearings 11, 11a. Rotor 15 is arranged to be rotated at a speed below the first critical resonant speed of the system by such means as a flexible drive belt 17 driven by motor 18. This rigid pedestal type rotor supporting unit 10 including the barium titanate force gage members 14, 14a, form a portion of the subject matter described and claimed in co-pending application Serial No. 305,271 filed concurrently herewith, by R. O. Fehr, C. S. Duckwald, R. O. Ringles, and M. W. Hellar, Jr. and assigned to the same assignee as the present invention. The output voltage from force gages 14, 14a is a varying voltage having the same frequency as the rotational frequency of rotor 15 and representing the unbalance forces exerted upon bearings 11, 11a by the rotation of rotor 15. In other words, force gages 14, 14a are arranged to measure the restraining forces of bearings 11, 11a.

The output voltage from either force gage 14 or 14a may be selected by a switch 19 to be supplied to an amplifier 20. This unbalance force voltage is amplified by amplifier 20 and supplied through a double integrator 23, or through a short circuiting path including switch 24 to the input circuits of a wattmeter 21 and a varmeter 22 connected in parallel. If switch 24 is closed the wattmeter and varmeter read values proportional to mass-acceleration units of unbalance, while if the switch 24 is opened the wattmeter and varmeter read values proportional to the mass-displacement units of unbalance due to the integrating action of double integrator 23.

It is to be understood that any means for obtaining an alternating voltage proportional to the unbalance mass of rotor 15 during rotation may alternatively be used in place of the rigid pedestal type unbalance force pickup unit 10 described above. A flexible pedestal pickup unit of the type disclosed in Patent 2,405,430 granted to Earl L. Kent on August 6, 1946, may, for example, be substituted for the rigid pedestal type pickup unit described above.

Referring again to Fig. 1, means such as lamp 25, disk 26, and photoelectric cell 27 are provided for producing a voltage pulse signal whose time of occurrence during each rotor cycle represents a predetermined periodically recurring angular position of rotor 15. Disk 26 is centrally mounted on shaft 16 and rotates together therewith. A line or similar mark 28 upon the face of disk 26 momentarily reduces the intensity of the light beam transmitted from lamp 25 and reflected from the face of disk 26 upon photocell 27 to produce a corresponding momentary decrease in the photoelectric output of photocell 27. Many other means for producing such angular position reference pulses are well known to the art and may alternatively be employed. For example, disk 26 may be omitted and a longitudinally extending mark on shaft 16 or even on rotor 15 may be substituted for mark 28 on disk 26 to produce this momentary interruption of the light transmitted to photocell 27. Suitable light-focusing lenses may of course be included to direct or image the light from lamp 25 upon photocell 27, and both lamp 25 and photocell 27 may be rigidly supported in a pretermined aligned position relative to or within the rotor supporting pedestal 10. The output angular position reference signal pulses from photocell 27 are amplified by amplifier 29 and supplied to an adjustable pulse delay circuit 30 which produces an output pulse adjustably delayed in time of occurrence after the input pulse received from the photocell 27. The output pulses from pulse delay circuit 30 thus have the same repetition rate as the input reference pulses, but occur a predetermined phase angle thereafter. These phase delayed output voltage pulses are supplied to energize and synchronize an alternating voltage generator circuit 31. Alternating voltage generator 31 is constructed to produce an alternating voltage whose fundamental frequency has a cyclical period equal to the time between successive input pulses from the pulse delay circuit regardless of the frequency of such input pulses. The frequency of the alternating voltage produced by generator 31 is thus equal to the pulse repetition frequency of the output pulses produced by photocell 27 which in turn are dependent upon the rotational frequency of rotor 15. Alternating voltage generator 31 may also be constructed to produce either a square wave output voltage or a sinusoidal wave output voltage depending upon whether an ordinary wattmeter is used for wattmeter 21 or an electronic wattmeter circuit. The alternating voltage output from generator 31 is supplied through a phase splitter to the remaining input circuits of parallel-connected wattmeter 21 and varmeter 22. Phase splitter 32 is preferably included in the circuit in order to enable the pulse delay circuit to produce a complete 360 degree phase shift of the alternating voltage supplied to wattmeter 21 and varmeter 22. A phase meter 33 is preferably also connected between the input to the wattmeter and the amplified input to the phase delay circuit 30 in order to provide an immediate visual indication of the amount of phase shift accomplished by the combination of the pulse delay circuit 30 and the alternating voltage generator 31.

A schematic circuit diagram of electric components in the angular position detecting channel corresponding to amplifier 29, pulse delay circuit 30, alternating voltage generator 31, and phase splitter 32 is illustrated in Fig 2. Amplifier 29 is shown as a conventional pulse amplifier circuit associated with pentode discharge device 35 which receives the input pulse signal produced by photocell 27 through a coupling capacitor 36 and supplies an amplified negative going voltage pulse through a coupling capacitor 37 to the pulse delay circuit comprising a multivibrator 38 and a differentiator and clipper 39. The adjustable width multivibrator 38 is connected to receive the amplified negative going output pulses from amplifier 29 and is energized in response thereto. Multivibrator 38 is a conventional monostable or "flip-flop" multivibrator circuit associated with triode discharge devices 41 and 42. The length of time during which the variable width multivibrator 38 remains in its unstable condition depends upon an adjustment of the bias voltage upon the control electrode 40 of discharge device 41 included in the multivibrator circuit. The output voltage of multivibrator 38 is taken from the anode of discharge device 41 and constitutes a negative going square wave whose duration depends upon the position of bias adjusting potentiometer 43. This square wave pulse is differentiated by a short time constant network comprising capacitor 44 and resistor 45 to produce a negative going voltage trigger pulse or "spike" during the initial voltage decrease of the multivibrator output square wave and a positive going voltage trigger pulse or "spike" during the subsequent voltage rise of the multivibrator output voltage as the multivibrator 38 reverts back to its stable condition of operation. The initial negative going pulse corresponding to the negative going input pulse output of amplifier 29 is clipped by rectifier 46 connected in parallel with resistor 45 to provide a low impedance path for such negative going voltages. The output of the differentiator and clipper 39 thus constitutes a positive going voltage pulse delayed in phase relative to the input voltage pulse supplied to pulse delay circuit 30 by an amount determined by the position of potentiometer 43. The phase delayed voltage pulse is supplied to energize the alternating voltage generator 31.

Alternating voltage generator 31 comprises a sawtooth wave generator 47 associated with electron discharge device 48, an amplitude clippng squarer 49 associated with electron discharge device 50 and a low pass filter circuit 51 associated with discharge device 52.

The discharge device 48 of sawtooth wave generator 47 is biased beyond conduction cutoff by connection from its control electrode through resistor 53 to a source of negative potential B—. Capacitor 54 is connected in parallel with discharge device 48 and resistor 55 is connected from the anode threof to a source of high positive potential B+. The charging time constant of capacitor 54 and resistor 55 is made longer than the period between successive input pulses supplied from multivibrator 48 at the slowest intended speed of rotor 15. The momentary positive trigger pulse supplied to control electrode of device 48 causes divice 48 to conduct, discharging capacitor 54. Immediately after the positive trigger has passed, discharge device 48 ceases conducting, and capacitor 54 begins to charge through resistor 55 toward the high positive potential B+ until a succeeding positive trigger pulse occurs, at which time discharge device 48 again conducts to discharge any potential accumulated across capacitor 54. A positive-going sawtooth wave of voltage is thus produced at the anode of discharge device 48 whose period is synchronized with the period between successive input positive trigger pulses. In other words, the sawtooth generated wave shown in Fig. 3 has the same frequency as the pulse repetition frequency of the input signal. By proper choice of circuit components the output sawtooth wave can be made to have a voltage swing of at least 50 volts even at fairly high pulse repetition frequencies, such as, for example, 100 cycles per second. The amplitude of this voltage swing will of course vary with frequency.

The positive sawtooth voltage wave produced at the anode of discharge device 48 is coupled through capacitor 56 to squarer 49, the capacitor 56 functioning to convert this positive sawtooth wave into an alternating voltage having a negative inversed sawtooth alternation A, and a positive alternation B as shown in Fig. 3. The amplitude of this sawtooth alternating voltage is clipped by double-diode discharge device 50 such that only a very small central portion of this alternating sawtooth wave adjacent the zero signal axis passes beyond device 50. This amplitude clipping action of discharge device 50 produces a balanced square wave cycle C having the same cyclical period as the sawtooth wave alternation produced by generator 47, and thus having the same cyclical frequency as the pulse repetition frequency detected by photocell 27 upon rotation of rotor 15. In accomplishing this clipping action, rectifier 57 begins to conduct whenever the positive alternation of the alternating sawtooth wave exceeds the bias voltage supplied to its cathode by bias battery 58 and thus functions to clip the amplitude of all positive voltages above this bias voltage, while rectifier 59 begins to conduct whenever the input voltage drops below ground potential and thus functions to clip the amplitude of all negative voltages below ground potential. The output square wave voltage thus has a voltage variation approximately equal to the value of the bias battery 58. The amplitude of this output square wave is constant regardless of the frequency or general amplitude of the much larger sawtooth wave voltage swing supplied to this amplitude clipping squarer 49 from generator 47.

The amplitude clipped square wave voltage developed across double diode 50 is directly connected through resistor 60 to a control electrode of discharge device 52 included in the low pass filter network 51. Discharge device 52 is connected as a conventional amplifier with a fairly large capacitor 61 and a "bridged-T" filter network 62 connected in parallel from the anode of discharge device 52 to ground. A resistor 63 is preferably also connected from the output terminal 64 of the "bridged-T" filter network 62 back to the control electrode of discharge device 52 in order to provide a degenerative feedback connection for improving the filtering action of the circuit. The RC filter components of this circuit are chosen in accord with well known design techniques to pass only frequencies below the maximum fundamental frequency corresponding to the highest rotational speed to be employed in the balancing of rotor 15. Low pass filter circuit 51 functions to convert the input square wave into a corresponding amplified sinusoidal wave having the same fundamental frequency as the input square wave, and thus having the same cyclical period as the period between successive pulses detected by photocell 27, although delayed in phase therefrom by an amount determined by the setting of potentiometer 43 in adjustable width multivibrator 38.

The sinusoidal output voltage from the filter 51 is supplied to phase splitter 32 comprising an amplifier stage 65 associated with a triode discharge device 66 and a phase inverter stage 67 associated with a triode discharge device 68. The output voltage to the wattmeter and varmeter circuits may be selected by means of switch 69 to be taken from either the output of amplifier stage 65 or phase inverter stage 67. The output voltage from phase splitter 32 may thus comprise a sinusoidal voltage that is either in-phase or 180 degrees out-of-phase with the alternating sawtooth wave voltage supplied to squarer 49. The additional phase inversion provided by stage 67 is desirable since the adjustable width multivibrator 38 cannot conveniently be constructed to produce a complete 360 degree phase delay of the input pulse supplied from photoelectric cell 27. Due to the additional 180 degrees phase shift produced by throwing switch 69 to a proper position, the adjustable width multivibrator need only be capable of delaying the input pulse from photocell 27 an amount equal to 180 degrees of the generated alternating voltage cycle.

In the operation of the dynamic balancing apparatus illustrated in Figs. 1 and 2, switch 19 is thrown to deliver the unbalance force voltage output of force gages 14 or 14a either directly or through double integrator 23 to the wattmeter 21 and varmeter 22. The movable tap of potentiometer 43 in the adjustable width multivibrator is then varied with switch 69 thrown to receive the in-phase or 180 degree out-of-phase voltage from phase splitter 32 until varmeter 22 reads zero or a predetermined null potential. When this adjustment is accomplished, the alternating unbalance force representing voltage delivered to one input coil of wattmeter 21 is exactly in phase with the generated angular position indicating alternating voltage supplied to the other input coil of wattmeter 21, from the angular position reference indicating channel. The cosine of the phase angle between the two input signals is thus equal to one, and the wattmeter reads a value proportional to the unbalance force detected by the force gages 14 or 14a as selected by switch 19. Moreover, since the amplitude of the square wave voltage output of the amplitude clipping squarer 49 is constant and low pass filter 50 and phase splitter 32 are designed to have fairly constant gain regardless of frequency, the reading of wattmeter 21 may be directly calibrated in terms of unbalance mass-acceleration or mass-displacement units, as desired.

The adjusted phase delayed alternating voltage supplied to wattmeter 21 and varmeter 22 from the angular position detecting channel also enables phase meter 33 to provide an immediate indication of the angular location of the unbalance mass. Phase meter 33 may be connected as shown to measure the phase difference between the time of occurrence of input pulse from photocell 27 and the output sinusoidal voltage delivered to the wattmeter and varmeter circuits; or it may be connected to directly measure the amount of phase shift introduced by pulse delay circuit 30. Phase meter 33 is preferably connected as shown to measure any additional phase shift introduced by low pass filter 51. Alternatively, potentiometer 43 may be calibrated to give a direct indication of the amount of pulse time delay introduced by the adjustable width multivibrator. However, such calibration may be expressed in terms of phase delay only at a particular input pulse frequency. Such precalibration of the position of the movable tap of potentiometer 43 is entirely feasible if the speed or speeds of rotation of rotor 15 is known. Phase meter 33 or the calibrated potentiometer 43 will, upon adjustment such that the varmeter reads zero, indicate the angular displacement of the unbalance mass from the mark 28 upon disk 26. It will be appreciated that this will be true regardless of the rotational position of lamp 25 and photocell 27 or the initial angular position with which disk 26 is attached to shaft 16. Lamp 25 and photocell 27 may therefore be rigidly supported in fixed light transmitting and light receiving alignment and need not be rotated or moved in order to determine the angular location of the unbalance mass.

It will thus also be seen that a single adjustment to the potentiometer 43 suffices to permit a reading upon wattmeter 21 of the magnitude of the unbalance mass and a reading upon phase meter 33 of the angular location of the unbalance mass.

Although we have described above a particular embodiment of the invention, many modifications may be made. It is to be understood that we intend to cover by the appended claims all such modifications as fall within the true spirit and scope of the invention.

What we claim as new and desire to secure by Letters Patent of the United States is:

1. Apparatus for analyzing unbalance in a rotating body comprising, means coupled to said rotating body for generating a first series of voltage pulses corresponding to a predetermined angular position of the rotating body, a pulse delay circuit connected to receive said first series of voltage pulses and energizable in response to each voltage pulse in said first series for providing a second series of voltage pulses each adjustably delayed to the same extent from each energizing pulse of said first series, means in said pulse delay circuit for varying the delay of said second series of voltage pulses, means connected to receive said second series of voltage pulses for generating a first alternating voltage synchronized in frequency and phase to said second voltage pulse series, means connected to receive said first voltage pulse series and said first alternating voltage for measuring the phase difference between said first voltage pulse series and said first alternating voltage, means connected to said rotating body for developing a second alternating voltage having a frequency corresponding to the speed of rotation of said body, an amplitude proportional to the extent of unbalance and a phase dependent upon an unknown angular position of unbalance, and a wattmeter and varmeter connected in parallel to receive both alternating voltages to indicate simultaneously values proportional to their product in their respective in-phase and 90 degree out-of-phase conditions, whereby, when said pulse delay varying means is adjusted for minimum value of said product indicated on said varmeter, the value of said product indicated on said wattmeter is indicative of the extent of unbalance of said rotating body and the phase difference between said first voltage pulse series and said first alternating voltage indicates the angular position of unbalance in said rotating body.

2. Apparatus for locating unbalance in a rotating body comprising, means coupled to said rotating body for generating voltage pulses corresponding to a predetermined recurring angular position of the rotating body, an electric pulse delay circuit connected to receive said generated pulses for providing output voltage pulses adjustably delayed in phase from said predetermined recurring angular position, means in said pulse delay circuit for varying the delay of said output voltage pulses, means connected to receive said generated pulses and said delayed output voltage pulses for measuring the extent of said voltage pulse delay, means connected to receive said delayed pulses for generating a first alternating voltage synchronized in frequency and phase to said delayed pulses, means connected to said rotating body for developing a second alternating voltage having an amplitude proportional to the extent of unbalance, a frequency corresponding to the rotational frequency of said body and a phase dependent upon an unknown angular position of unbalance, and means connected to receive said first and second alternating voltages for indicating simultaneously values proportional to their product in their respective in-phase and 90 degree out-of-phase conditions.

3. Apparatus for locating unbalance in a rotating body comprising, means coupled to said rotating body for generating a first series of voltage pulses corresponding to a predetermined recurring angular position of the rotating body, electric means responsive to said first voltage pulse series for generating a second series of voltage pulses each adjustably delayed to the same extent from different pulses of said first series, means in said second voltage pulse series generating means for varying the delay of said second series of voltage pulses, means connected to receive said second voltage pulse series for generating a first alternating voltage synchronized in frequency and phase to said second voltage pulse series, means connected to receive said first and second voltage pulse series for measuring the phase difference between said first and second series of pulses, means connected to said rotating body for developing a second alternating voltage having an amplitude proportional to the extent of unbalance, a frequency corresponding to the rotational speed of said body and a phase dependent upon an unknown angular position of the unbalance mass, and means connected to receive said first and second alternating voltages for indicating simultaneously the product of said voltages in their respective in-phase and 90 degree out-of-phase conditions.

4. Apparatus for locating unbalance in a rotating body comprising, means connected to said rotating body for developing a first alternating voltage having a frequency corresponding to the rotational frequency of said body and a phase dependent upon an unknown angular position of unbalance, means coupled to said rotating body for developing voltage pulses initiated in response to a predetermined recurring angular position of the rotating body, means in said voltage pulse developing means for varying the width of said voltage pulses, means in said voltage pulse developing means for indicating the width of said voltage pulses, means for generating a sawtooth voltage wave having alternating polarity, means connecting said voltage pulse developing means and said sawtooth wave generating means for synchronizing the operation of said sawtooth wave generating means to the trailing edges of said voltage pulses, means connected to said sawtooth wave generating means for clipping the peaks of the sawtooth wave output of said generator to provide a constant amplitude second alternating voltage synchronized in frequency and phase to said pulse trailing edges, and means connected to receive said first and second alternating voltages for indicating a predetermined relative phase condition between said first and second alternating voltages, whereby, when said predetermined relative phase condition exists, the width of said voltage pulses indicates the angular position of unbalance in said rotating body.

5. Apparatus for locating unbalance in a rotating body comprising, a photosensitive circuit including a photosensitive element arranged in a fixed position adjacent the rotating body, means attached to the rotating body for momentarily varying the light intensity falling upon said photosensitive element upon the occurrence of a predetermined angular position of said body, a square wave generator connected to be energized in response to output voltage pulses from said photosensitive circuit, means in said square wave generator for varying the width of the square waves generated by said square wave generator, means connected to receive said square waves for developing a first alternating voltage synchronized in frequency and phase to the trailing edges of the square waves, means in said square wave generator for indicating the width of said generated square waves, means connected to said rotating body for developing a second alternating voltage having a frequency corresponding to the rotational speed of said body and a phase dependent upon an unknown angular position of the unbalance mass, and means connected to receive said first and second alternating voltages for indicating a predetermined relative phase condition between said first and second alternating voltages, whereby, when said predetermined relative phase condition exists, the width of said generated square waves indicates the angular position of unbalance in said rotating body.

References Cited in the file of this patent

UNITED STATES PATENTS

| | | |
|---|---|---|
| 2,451,863 | Oakley | Oct. 19, 1948 |

FOREIGN PATENTS

| | | |
|---|---|---|
| 632,652 | Great Britain | Nov. 28, 1949 |

OTHER REFERENCES

Weston Engineering Notes, Apr. 1947, vol. 2, No. 2, pp. 1 and 2, The Measurement of Reactive Power, published by Weston Electrical Inst. Corp., Newark 5, N. J.